US012684521B2

(12) United States Patent
Priyanto et al.

(10) Patent No.: US 12,684,521 B2
(45) Date of Patent: Jul. 14, 2026

(54) METHODS FOR POSITIONING A WIRELESS DEVICE, A RELATED WIRELESS NODE AND A RELATED LOCATION NETWORK NODE

(71) Applicant: Sony Group Corporation, Tokyo (JP)

(72) Inventors: Basuki Priyanto, Lund (SE); Yujie Zhang, Lund (SE)

(73) Assignee: Sony Group Corporation, Tokyo (JP)

( * ) Notice: Subject to any disclaimer, the term of this patent is extended or adjusted under 35 U.S.C. 154(b) by 246 days.

(21) Appl. No.: 18/281,670

(22) PCT Filed: Mar. 29, 2022

(86) PCT No.: PCT/EP2022/058232
§ 371 (c)(1),
(2) Date: Sep. 12, 2023

(87) PCT Pub. No.: WO2022/207622
PCT Pub. Date: Oct. 6, 2022

(65) Prior Publication Data
US 2024/0155537 A1     May 9, 2024

(30) Foreign Application Priority Data

Mar. 29, 2021     (SE) .................................... 2150380-0

(51) Int. Cl.
*G01S 1/08*          (2006.01)
*H04B 7/08*          (2006.01)
(Continued)

(52) U.S. Cl.
CPC ............ *H04W 64/00* (2013.01); *H04B 7/086* (2013.01); *H04L 5/0051* (2013.01); *H04W 16/28* (2013.01); *H04W 24/10* (2013.01)

(58) Field of Classification Search
CPC ..... H04W 64/00; H04W 16/28; H04W 24/10; H04B 7/086; H04L 5/0051; G01S 3/04;
(Continued)

(56) References Cited

U.S. PATENT DOCUMENTS 11,619,702 B2 * 4/2023 Gummadi ................. G01S 5/10
                                                          342/378
11,831,679 B2 * 11/2023 Bouthemy ......... H04B 7/18565
(Continued)

FOREIGN PATENT DOCUMENTS

CN        102884445 A        1/2013
JP        2005114666 A        4/2005
(Continued)

OTHER PUBLICATIONS

International Search Report from corresponding International Application No. PCT/EP2022/058232, mailed Jul. 18, 2022, 13 pages.
(Continued)

*Primary Examiner* — Kenneth T Lam
(74) *Attorney, Agent, or Firm* — Tucker Ellis LLP

(57)          ABSTRACT
A method performed by a wireless node is disclosed, for enabling positioning of a wireless device, WD. The method comprises receiving, from a location network node, assistance information comprising an estimated range of angles to be used for a positioning method of the WD. The method comprises performing a positioning method for the WD based on the assistance information.

17 Claims, 10 Drawing Sheets

(51) Int. Cl.
     *H04L 5/00*          (2006.01)
     *H04W 16/28*       (2009.01)
     *H04W 24/10*       (2009.01)
     *H04W 64/00*       (2009.01)

(58) Field of Classification Search
     CPC ........ G01S 5/02; G01S 5/0081; G01S 5/0236;
                                 G01S 5/0218; G01S 1/08
     See application file for complete search history.

(56)                References Cited

U.S. PATENT DOCUMENTS

| | | |
|---|---|---|
| 2002/0077119 A1 | 6/2002 | Fitch |
| 2007/0232324 A1 | 10/2007 | Kim |
| 2018/0295601 A1 | 10/2018 | Wang |
| 2019/0037529 A1 | 1/2019 | Edge |
| 2019/0166453 A1* | 5/2019 | Edge ......................... G01S 5/06 |
| 2019/0223140 A1 | 7/2019 | Grossmann |
| 2019/0364390 A1 | 11/2019 | Kurras |
| 2019/0369201 A1 | 12/2019 | Akkarakaran |
| 2020/0021946 A1* | 1/2020 | Kumar .................. G01S 1/0428 |
| 2020/0145977 A1* | 5/2020 | Kumar .................. G01S 5/0063 |
| 2020/0275236 A1* | 8/2020 | Gangakhedkar ...... H04W 4/025 |
| 2022/0326334 A1* | 10/2022 | Liu ............................ G01S 5/02 |
| 2022/0334212 A1* | 10/2022 | Liu ....................... H04L 5/0051 |
| 2022/0357418 A1* | 11/2022 | Wang ................... H04L 5/0069 |
| 2023/0171758 A1* | 6/2023 | Si ........................... H04L 5/0051 |
| | | 370/329 |

FOREIGN PATENT DOCUMENTS

| | | |
|---|---|---|
| JP | 2007518968 A | 7/2007 |
| JP | 2011013031 A | 1/2011 |
| JP | 2013174498 A | 9/2013 |
| JP | 2016176789 A | 10/2016 |
| JP | 2016536607 A | 11/2016 |
| JP | 2021509171 A | 3/2021 |
| WO | WO-2020012591 A | 1/2020 |
| WO | 2021006803 A1 | 1/2021 |
| WO | 2021054870 A1 | 3/2021 |

OTHER PUBLICATIONS

Office Action and Search Report from corresponding Swedish Application No. 2150380-0, mailed on Dec. 6, 2021, 8 pages.

\* cited by examiner

100

S104 Receiving assistance information comprising an estimated range of angles to be used for a positioning procedure of the WD S106 Performing a positioning procedure for the WD based on the assistance information

S106A | S106B | S106C | S106D

S108 Providing a measurement report comprising a positioning measurement for the WD obtained during the positioning procedure

400

600

METHODS FOR POSITIONING A WIRELESS DEVICE, A RELATED WIRELESS NODE AND A RELATED LOCATION NETWORK NODE

The present disclosure pertains to the field of wireless communications. The present disclosure relates to methods for positioning of a wireless device, a related wireless node and a related network node.

BACKGROUND

Positioning is an important feature of the $3r$ d Generation Partnership Project (3GPP) Fifth Generation (5G) New Radio (NR), targeting high accuracy positioning of wireless devices. Positioning in 5G NR is designed to support indoor factory deployments that require high accuracy positioning of objects for localization and automation purposes. For example, on a factory floor, it may be beneficial to locate assets and moving objects such as forklifts, or parts to be assembled. Similar needs exist in, for example, transportation and logistics. However, indoor factory deployments are considered as a challenging scenario for a system which relies on radio propagation. An indoor deployment may generate a high number of non-line of sight (NLOS) components received at the receiver, which may affect the positioning accuracy.

Uplink-Angle of Arrival (UL-AoA) and Downlink-Angle of Departure (DL-AoD) are two positioning methods that have been introduced in 5G NR positioning. In UL-AoA the position of the wireless device is estimated based on an angle of arrival of reference signals received at the wireless node from a wireless device. In DL-AoD the position of the wireless device is estimated based on an angle of departure of reference signals transmitted to the wireless device from a wireless node.

The accuracy of the UL-AoA and DL-AoD positioning methods may, however, be adversely affected by, for example, surroundings of the wireless device interfering with a propagation path of the reference signals.

SUMMARY

Accordingly, there is a need for devices (wireless node and location network node) and methods performed therein for enabling positioning of a wireless device, which mitigate, alleviate or address the shortcomings existing and provide a higher accuracy positioning of the wireless device.

A method is disclosed, performed by a wireless node, for enabling positioning of a wireless device (WD). The method comprises receiving, from a network node, assistance information comprising an estimated range of angles to be used for a positioning method of the WD. The method comprises performing a positioning method for the WD based on the assistance information.

Further, a wireless node is provided, the wireless node comprising memory circuitry, processor circuitry, and a wireless interface, wherein the wireless device is configured to perform the method disclosed herein.

It is an advantage of the present disclosure that the wireless node, based on the assistance information received from the location network node, may manage its transmission and/or reception of reference signals more efficiently, which may improve the accuracy of the positioning method of the wireless device and improve the resource utilization of positioning reference signals.

The wireless node may use the assistance information to manage beam sweeping more efficiently. The wireless node may for example perform beam sweeping using only beams covering the estimated range of angles, such as covering an estimated position of the wireless device, when transmitting and/or receiving reference signals for the positioning method.

By performing a beam sweep only in the estimated range of angles, a beam width of the beams used during the positioning method may be reduced which may increase the granularity of the positioning measurements performed in the estimated angular range. This may improve the accuracy of the positioning method of the wireless device.

Furthermore, by performing the positioning method based on the assistance information, such as based on the estimated range of angles, the latency and/or efficiency of the positioning method may be reduced, since the wireless node may only sweep a subset of its available beams during the positioning method, which may further improve the positioning accuracy of the wireless device.

This may also increase the network efficiency, since the number of reference signal resources used in one measurement occasion may be reduced.

Furthermore, by performing the positioning method based on the assistance information, such as based on the estimated range of angles, multipath components of the reference signal transmissions not being received by the wireless node in the estimated range of angles can be filtered out in the computation and/or calculation of angle of arrival (AoA). Thereby, the risk of components of the reference signal transmission being reflected by obstacles and/or unexpected reflectors in the transmission path between the wireless device and the wireless node, which may otherwise obscure the positioning estimation, may be reduced.

Further, a method is disclosed, performed by a location network node, for positioning a wireless device. The method comprises obtaining information indicative of a first position of the wireless device. The method comprises estimating, based on the information indicative of the first position, a range of angles to be used by a wireless node for a positioning method of the WD. The method comprises transmitting, to the wireless node, assistance information comprising the estimated range of angles.

Further, a location network node is provided. The location network node comprising memory circuitry, processor circuitry, and a wireless interface, wherein the location network node is configured to perform the method disclosed herein.

It is an advantage of the present disclosure that the location network node may estimate a first position of the wireless device and may provide the wireless node with an estimated range of angles in which the wireless node is to perform the positioning method for the wireless device in the estimated position. Thereby, the location network node can indicate the estimated direction in which reference signals are expected to be transmitted to or received from the wireless device. Thereby the location network node can assist the wireless node in managing its transmission and/or reception of reference signals more efficiently, which can improve the accuracy of the positioning method of the wireless device.

BRIEF DESCRIPTION OF THE DRAWINGS

The above and other features and advantages of the present disclosure will become readily apparent to those skilled in the art by the following detailed description of examples thereof with reference to the attached drawings, in which.

DETAILED DESCRIPTION

Figure 1:
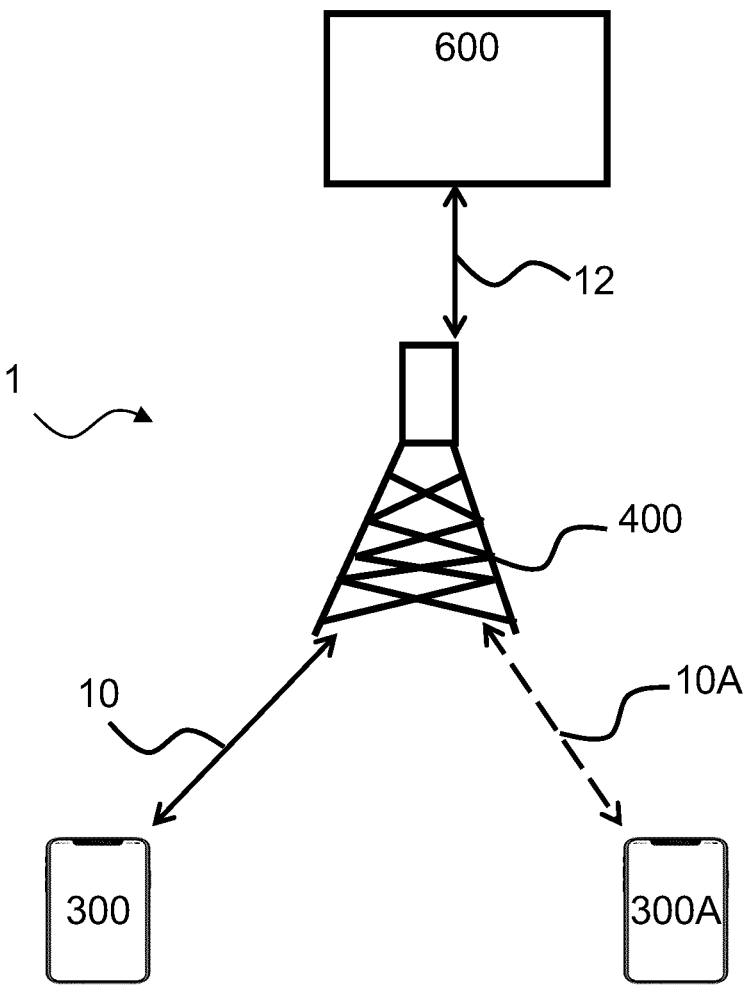
FIG. 1 is a diagram illustrating an example wireless communication system comprising an example location network node, an example wireless node and an example wireless device according to this disclosure.

Various examples and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the examples. They are not intended as an exhaustive description of the disclosure or as a limitation on the scope of the disclosure. In addition, an illustrated example needs not have all the aspects or advantages shown. An aspect or an advantage described in conjunction with a particular example is not necessarily limited to that example and can be practiced in any other examples even if not so illustrated, or if not so explicitly described.

The figures are schematic and simplified for clarity, and they merely show details which aid understanding the disclosure, while other details have been left out. Throughout, the same reference numerals are used for identical or corresponding parts.

FIG. 1 is a diagram illustrating an example wireless communication system 1 comprising an example location network node 600, an example wireless node 400 and an example wireless device (WD) 300 according to this disclosure.

As discussed in detail herein, the present disclosure relates to a wireless communication system 1 comprising a cellular system, for example, a 3GPP wireless communication system.

The wireless node 400 disclosed herein refers to a radio access network node operating in the radio access network, such as a base station, an evolved Node B, eNB, gNB in NR or a transmission point (TRP). In one or more examples, the wireless node is a functional unit which may be distributed in several physical units. The wireless node 400 may be configured to communicate with a core network node, such as the location network node 600, via a link 12.

The location network node disclosed herein may refer to a network node operating in the core network, such as in the Evolved Packet Core Network, EPC, and/or a 5G Core Network, 5GC.

In one or more examples, the location network node, such as a location server (LS) and/or a Location Management Function (LMF), is a functional unit which may be distributed in several physical units.

The wireless communication system 1 described herein may comprise one or more wireless devices 300, 300A, and/or one or more wireless nodes 400, such as one or more of: a base station, an eNB, a gNB, a TRP and/or an access point.

A wireless device may refer to a mobile device and/or a user equipment, UE. The wireless device 300, 300A may be configured to communicate with the wireless node 400 via a wireless link (or radio access link) 10, 10A.

A position of the WD 300 in the wireless communication system may be determined by performing a positioning method based on an angle of a reference signal transmission associated with the WD 300. The reference signal transmission being associated with the WD 300 herein means that the reference signal is transmitted or received by the WD 300. The reference signal transmission may be in the uplink (UL) and/or in the downlink (DL).

When the reference signal transmission is in UL, the reference signals, such as a Sounding Reference Signals (SRS), may be transmitted by the WD and received by the wireless node. The WD may transmit the UL reference signals over one or more beams, such as one or more transmit beams, such as one or more transmit spatial filter. In the UL, performing the positioning method may comprise the wireless node measuring an angle of arrival (AoA) of the reference signals, such as the SRS, received at the wireless node. This positioning method may be referred to as an UL-AoA positioning method. When the reference signal transmission is in the DL, the reference signals, such as Positioning Reference Signals (PRS), may be transmitted by the wireless node and may be received by the WD. The wireless node may transmit the DL reference signals over one or more beams, such as one or more transmit beams, such as one or more transmit spatial filter. The term beam herein means a spatial filter which separates one beam from other beams from the same device, such as from the wireless node and/or the WD.

In the DL, the WD may report the strongest beam to the location network node. The report may comprise a PRS resource ID associated with the strongest beam. The location network node may estimate the location of the WD based on the report and may estimate an angle of departure (AoD) from the wireless node of the reference signal transmission associated with the WD based on the estimated position of the WD. This positioning method may be referred to as a DL-AoD positioning method.

In the uplink angle of arrival (UL-AoA) positioning method, the location network node, such as the location server (LS) and/or the Location Management Function (LMF), may estimate the location of the WD based on AoA measurements reported from multiple wireless nodes, such as TRPs and/or gNBs.

Although the example methods disclosed herein relate to UL-AoA and DL-AoD, DL-AoA and UL-AoD positioning methods are also possible and are compatible with the present disclosure discussed in detail below. In DL-AoA and UL-AoD the WD performs the processing of beam angles, in a similar way as disclosed in the following for the wireless node.

Figure 2:
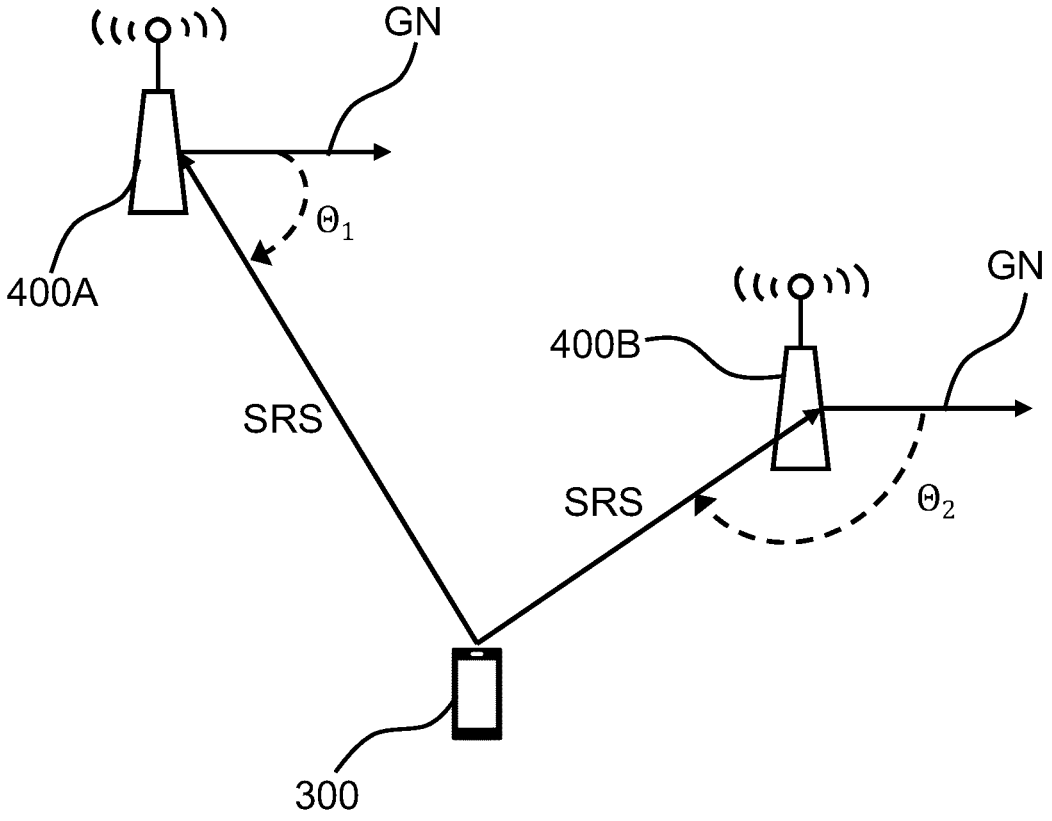
FIG. 2 is a diagram illustrating two example wireless nodes and an example wireless device during an angle of arrival positioning method according to this disclosure.

FIG. 2 illustrates an UL-AoA measurement procedure where a first wireless node 400A and a second wireless node 400B estimate a respective AoA of a reference signal transmitted from a WD 300. The WD 300 may transmit UL Sounding Reference Signal (SRS) resources to a serving wireless node, such as to the first wireless node 400A, and to neighboring wireless nodes, such as to the wireless node 400B. The first wireless node 400A may receive the reference signals at an angle $\theta_1$ from the WD 300. The second wireless node 400A may receive the reference signals at an angle $\theta_2$ from the WD 300. The AoA, such as the angles $\theta_1$ and $\theta_2$, may be measured relative to a respective Local Coordinate System (LCS) of each of the wireless nodes. The AoA may in one or more example methods be measured relative to a global coordinate system (GCS) of the wireless nodes, as defined in section 5.2.4 in 3GPP TS 38.215 ver.16.1.0. In one or more example methods, the angle measured relative to the LCS can be transferred to an angle relative to GCS. When the angles are measured relative to the GCS, the reference for the angles is relative to a geographical north GN.

UL-AoA is defined as the estimated azimuth angle and vertical, also referred to as zenith, angle of a WD with respect to a reference direction. The reference direction may in one or more example methods be defined in the GCS, wherein estimated azimuth angle is measured relative to geographical North and is positive in a counter-clockwise direction, and the estimated vertical angle is measured relative to zenith and positive to horizontal direction. The reference direction may in one or more example methods be defined in the LCS, wherein the estimated azimuth angle is measured relative to an x-axis of LCS and positive in a counter-clockwise direction and the estimated vertical angle is measured relative to z-axis of the LCS and positive to a x-y plane direction. The bearing, down tilt and slant angles of LCS are defined according to 3GPP TS 38.901 ver.16.1.0. The UL-AoA may be determined at the wireless node antenna for an UL channel associated with the WD.

By measuring a phase difference across the Receiver (Rx) Multiple Input Multiple Output (MIMO) antenna elements, the wireless nodes can calculate an angular power spectrum. Following that, the wireless nodes 400a, 400B, may estimate the AoA of the received UL SRS resources and may report their respective angle measurements to the location network node via an NR Positioning Protocol A (NRPPa) protocol to enable the location network node to perform an estimation of the position of the WD 300. The location network node may then estimate, such as may calculate, the WD position based on the UL AoA measurements of multiple network nodes, such as multiple TRPs and/or gNBs. The wireless node may play an essential role in the positioning method, since it estimates, such as measures the AoA. The accuracy of the measured AoA is a main factor for the WD position estimation accuracy.

In some deployments however, such as in indoor factory deployments, obstacles and/or unexpected reflectors, such as metal objects, may exist, such as may be located, in a transmission path between a wireless node and a wireless device. Such objects may reflect radio signals, such as reference signals, transmitted from and/or to one or more wireless nodes, which may cause a generation of Non-Line of Sight (NLoS) components of the radio signals. A first arrival path component, which may also be referred to as a Line of Sight (LoS) component, of a radio signal may herein be understood as a component of a radio signal transmitted between the wireless node and the wireless device either in a straight path free of any form of obstruction, or in a straight path transmitted through an obstructing material, but leaving sufficient transmission, such as transmission energy, for radio waves to be detected. The NLoS component of a radio signal on the other hand may be a component of the transmitted radio signal that is not a LoS component, such as a component that is not directly transmitted between the wireless node and the wireless device, but is propagated and reflected by external objects, such as metal objects in the indoor factory deployment. Typically, NLoS components arise from reflections of the radio signals on scattering objects located in a propagation environment.

Figure 3:
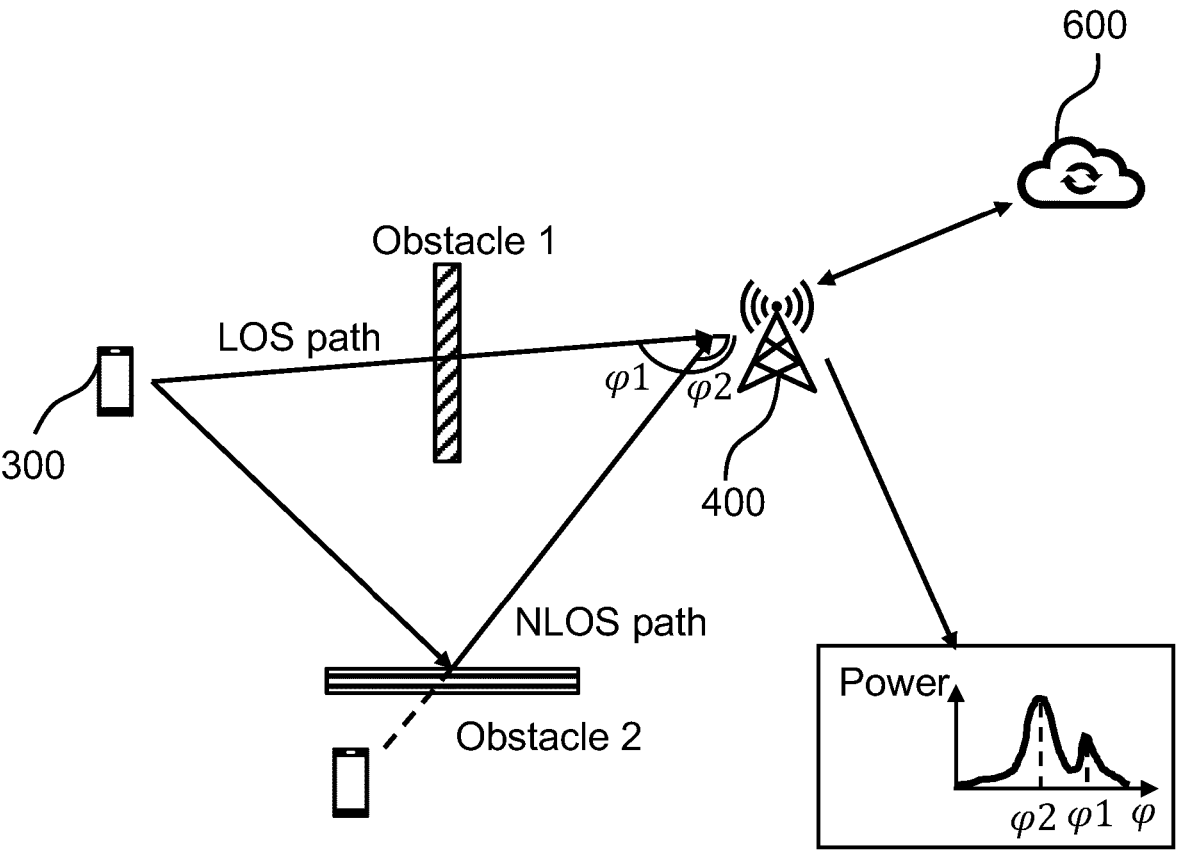
FIG. 3 is a diagram illustrating a legacy angle of arrival positioning method in the uplink.

FIG. 3 illustrates an example of how the NLoS component may affect an AoA measurement, by causing an angle ambiguity problem in the AoA estimation, according to one or more known, such as legacy, positioning methods. The performance of the AoA estimation may be degraded by a multipath channel effect. The multipath channel effect is a propagation phenomenon resulting in a radio signal reaching a receiving antenna, such as an antenna of the wireless device in DL or an antenna of the wireless node in Uplink UL, by two or more paths, such as by a LoS path and a NLoS path. The power from the NLoS path can be greater than the LoS path under certain circumstances. Consequently, the wireless node may select the angle from the NLoS path of the received reference signal as the estimated AoA, which may compromise performance of, or cause an error in, the positioning estimation of the WD. In the example shown in FIG. 3 and for simplicity, it is assumed that only two propagation paths are available for transmission from the WD 300 to the wireless node 400, however there may also be further propagation paths available from the WD 300 to the wireless node 400. The reference signal, such as an SRS, transmitted from the WD 300 may penetrate through a first obstacle, in FIG. 3 referred to as Obstacle 1, and may lose power but finally reaches the wireless node 400. A second obstacle, in FIG. 3 referred to as Obstacle 2, may act as a reflector and may provide the signal to the wireless node 400 with an NLOS propagation path. The wireless node 400 may perform a measurement, such as an RSRP measurement over an angular spectrum of its received beams, such as received spatial filters. In the angular power spectrum estimated by the wireless node 400, the wireless node 400 would consider the angle having the largest power as the AoA of the SRS signal, which in this case would result in an erroneous location estimation since the NLoS path received at angle φ2 has a higher RSRP than the LoS path received at angle φ1. If φ2 corresponding to the NLOS component has dominant power, such as RSRP, then the overall angular spectrum may be wrong and may lead to a wrong estimation of AoA.

In the NR DL-AoD positioning method, the location network node, such as the LS and/or the LMF, may estimate the location of the WD based on a Reference Signal Received Power (RSRP) measurement report of one or multiple DL PRS resources from each of one or more wireless nodes, such as TRPs. The wireless nodes may transmit multiple DL PRS resources and each DL PRS resource may carry one steering Tx beam. Each DL PRS resource may have an identity (ID) number. In 3GPP Frequency Range 2 (FR2), each Tx beam may be one analog transmit beam or a combination of baseband precoder and an analog transmit beam. In FR1, each Tx beam may be one precoder. The WD may measure the RSRP of each DL PRS resource and may report the RSRP of one or more best DL PRS resources, such as one or more DL PRS resources having a highest RSRPs, such as one or more DL PRS resources having a RSRP above an RSRP threshold. Based on the reported information from the WD, the location network node may estimate an AoD of the transmission to the WD with respect to each wireless node and may then calculate the location of the WD based on the AoD.

One factor that may affect the performance of the DL-AoD positioning method is the number of DL PRS resources and the beamwidth of the Tx beam applied to each DL PRS resource. An error in the AoD estimation may be inversely proportional to the beamwidth of the Tx beam. To achieve a high accuracy in DL-AoD positioning, a narrow Tx beam may be required and thus a large number of DL PRS resources is required to fully cover a cell area.

Figure 4:
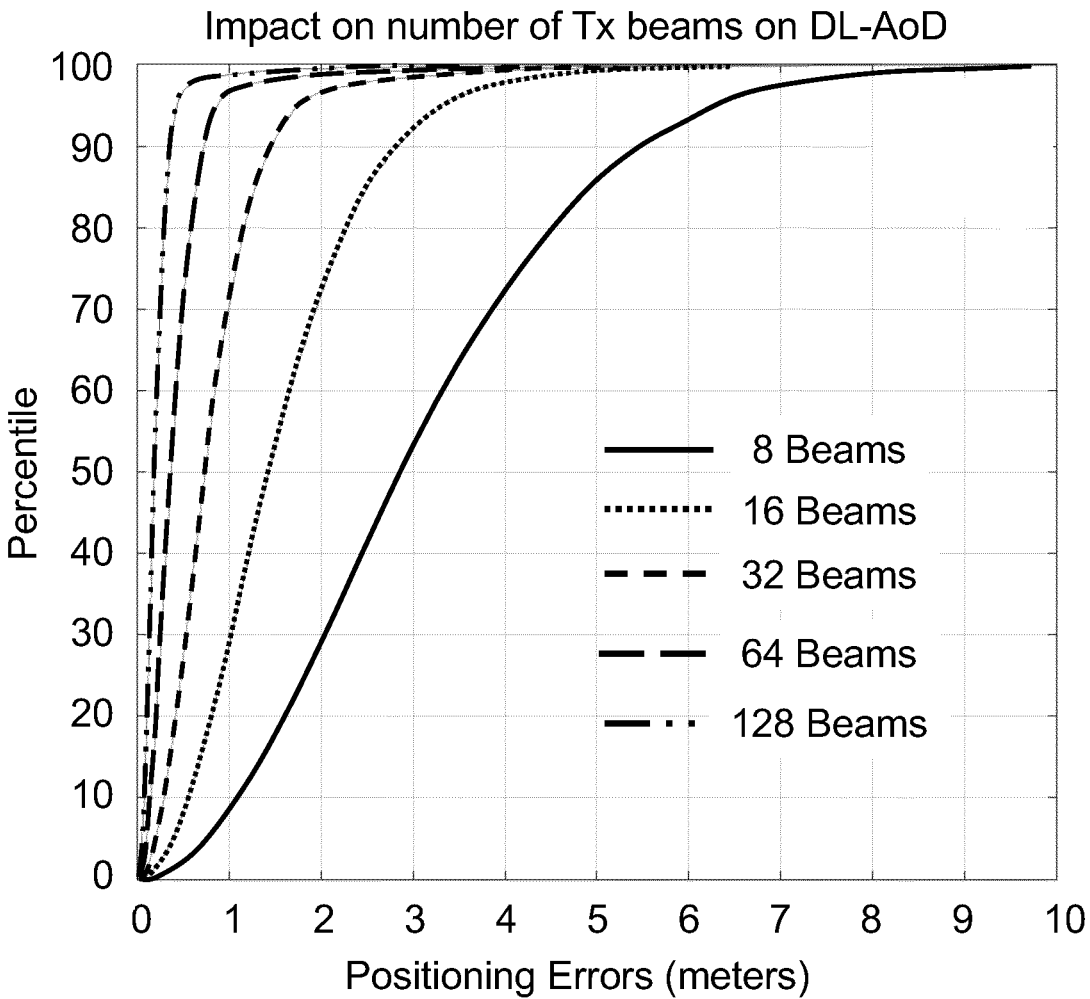
FIG. 4 is a diagram illustrating a performance of an angle of departure positioning method performed in the downlink as a function of the number of transmit beams.

FIG. 4 illustrates the impact of the number of Tx beams (such as the number of DL PRS resources) on the accuracy of a DL-AoD positioning method, according to 3GPP R1-2100130_Enhancements for DL-AoD positioning. In the simulation, a 120-degree sector area was covered by various numbers of DL PRS resources with uniformly arranged Tx beams. The number of DL PRS resources per wireless node was 8, 16, 32, 64 and 128. The WD reports the RSRP of the best DL PRS resource for each wireless node. FIG. 4 illustrates simulation results indicating the performance of the DL-AoD positioning method, dependent on the number of Tx beams used. As can be seen in FIG. 4, when a larger number of the DL PRS resources can be used for measurement, the accuracy of the positioning will be increased. However, in practical cases, a large amount of Tx beams (such as 128 Beams) may not be feasible in current positioning methods. One limitation of current positioning methods may be the maximum number of the PRS-RSRPs reported from the WD to the location network node, such as the LMF and/or the LS. In Re1.16 NRPPa protocol (3GPP TS 38.455 ver. 16.2.0) for example, this number is restricted to 8. It has been shown that, besides the main beam (such as the beam having the strongest RSRP), the RSRPs from other beams may improve the AoD measurement accuracy. However, if the number of Tx beams is too large the WD cannot report all the beams to the location network node. Consequently, in current positioning methods some information in the estimated AoD power spectrum may be lost (e.g., the other paths), and the location network node would not be able to perform further analysis in the channel.

Another limitation of the known positioning methods may be network efficiency. A large number of DL PRS resources may increase the resource overhead and decrease the network efficiency as more time/frequency slots are used for a single AoD measurement. Hence, a problem of performing a sweeping beam operation with too many or too few beams may be seen as a trade-off problem between having high accuracy or high network efficiency. If a large number of narrow Tx beams are used, a high AoD measurement accuracy but low network efficiency may be achieved. If on the other hand a small number of wide Tx beams are used, a high network efficiency but low AoD accuracy may be achieved.

In order to address the drawbacks with the known positioning methods, such as the UL-AoA positioning method and/or the DL-AoD positioning method, and provide a positioning method having an improved accuracy, a method is provided in which the location network node provides assistance information to the wireless node for performing the positioning method. Assistance information may be seen as information that may be used by the wireless node, to assist in the positioning method of the WD. The assistance information may comprise an estimated range of angles to be used for the positioning method. In one or more example methods, the range of angles may be given by an upper and a lower bound of an angle interval. In one or more example methods, the estimated range may be given by a reference direction and a width of the range of angles. The reference direction may indicate a center angle of the range of angles or a center beam to be used for the transmission and/or reception in the estimated range of angles.

Figure 5:
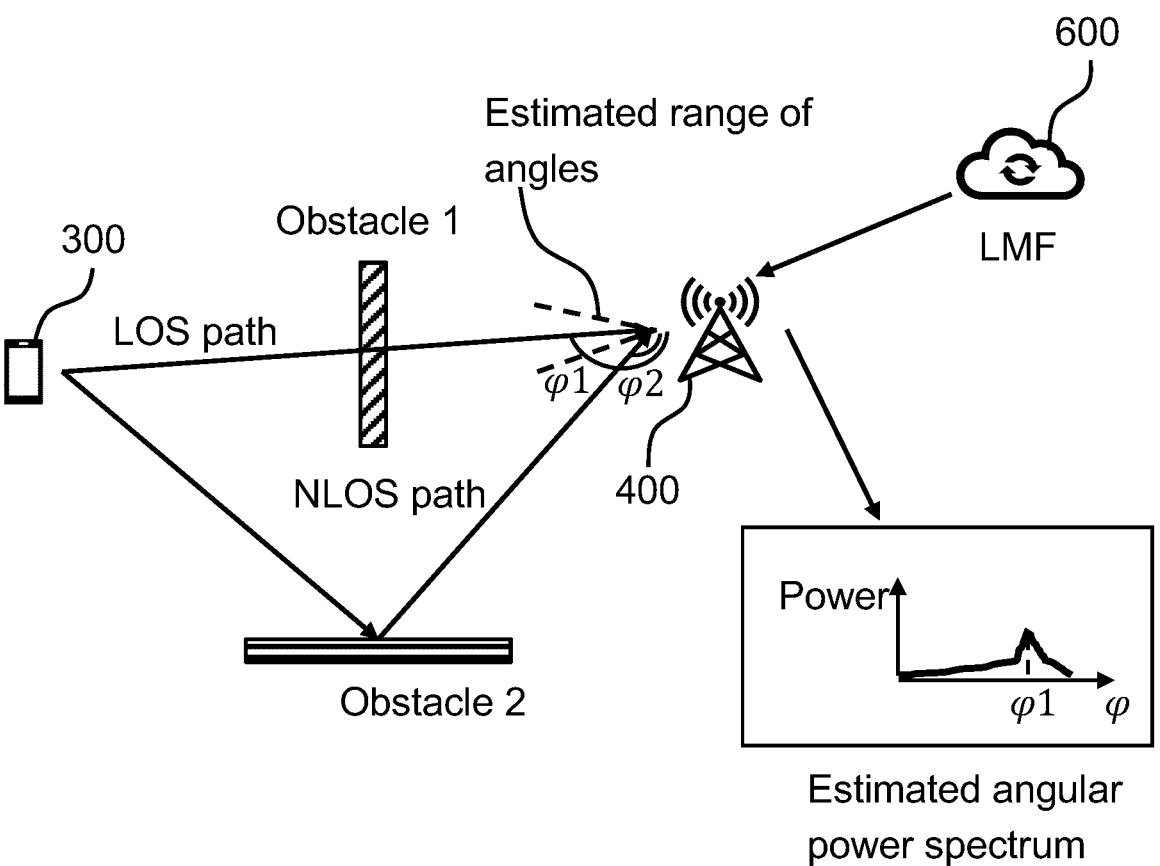
FIG. 5 is a diagram illustrating an angle of arrival positioning method in the uplink according to an example of this disclosure.

FIG. 5 discloses an example of a wireless node 400 performing a refined AoA measurement based on assistance information received from the location network node 600 according to the current disclosure, in order to address the angle ambiguity problem caused by the NLOS channel during positioning with the UL-AoA procedure. For each measurement occasion, the location network node 600 may estimate, such as calculate a location and a location uncertainty of the WD 300 based on previous location estimations, such as AoA measurements and/or quality metrics reported from multiple wireless nodes 400. The location network node 600 may estimate a range of angles, such as an expected AoA range, for a reference signal received from the WD 300 based on historical, such as previous, WD location estimations and the location uncertainty. The AoA range may comprise an estimated Azimuth AoA (AAoA) and/or Zenith AoA (ZAoA) range for each wireless node 400. When the location network node has estimated the AoA, the location network node 600 may provide assistance information comprising the estimated AoA range to the wireless node 400, for example via the NRPPa protocol. The estimated AoA range, such as the estimated AAoA and/or ZAoA range, may be specific for each WD 300 and wireless node 400 combination, which may also be referred to as the estimated AoA range being WD/TRP-specified. The estimated AAoA and/or ZAoA range may in one or more example methods be specific for a given time and period. The wireless node 400 may not be aware which WD that may perform the positioning method. The wireless node 400 may only have received assistance information, so that it performs AoA with the operating angle within the estimated AoA range comprised in the assistance information. The estimated AoA range being specific for each WD and wireless node combination means that one range of angles is associated with one specified wireless node 400, such as TRP and/or gNB. Furthermore, the estimated AoA range may also be associated with a WD 300 or a group of WDs. Based on the assistance information, such as based on the estimated range of AoA, the wireless node 400 may perform a refined AoA measurement in the estimated range of AoD, that can mitigate the NLOS effect. In a following round of AoA measurements, the wireless node 400 may filter out the transmission paths that reach the wireless node 400 at an AoA that is outside of the estimated range of angles. In some NLOS channel cases, such as in the example scenario shown in FIG. 5, the NLOS path in the angular power spectrum received at an angle φ2 can thereby be successfully excluded from the reported angular range, such that only positioning measurements performed on the LoS path, received at an angle φ1, of the received reference signal transmission, is reported to the location network node 600.

The assistance information provided to the wireless node by the location network node may also be used for the DL-AoD positioning method, to improve positioning accuracy and network efficiency. The location network node, such as the LS or LMF, may provide an estimated, such as expected, AoD range to each wireless node, such as TRP and/or gNB. Based on the assistance information, such as the estimated AoD range, the wireless node may configure its Tx beams accordingly.

Figure 6:
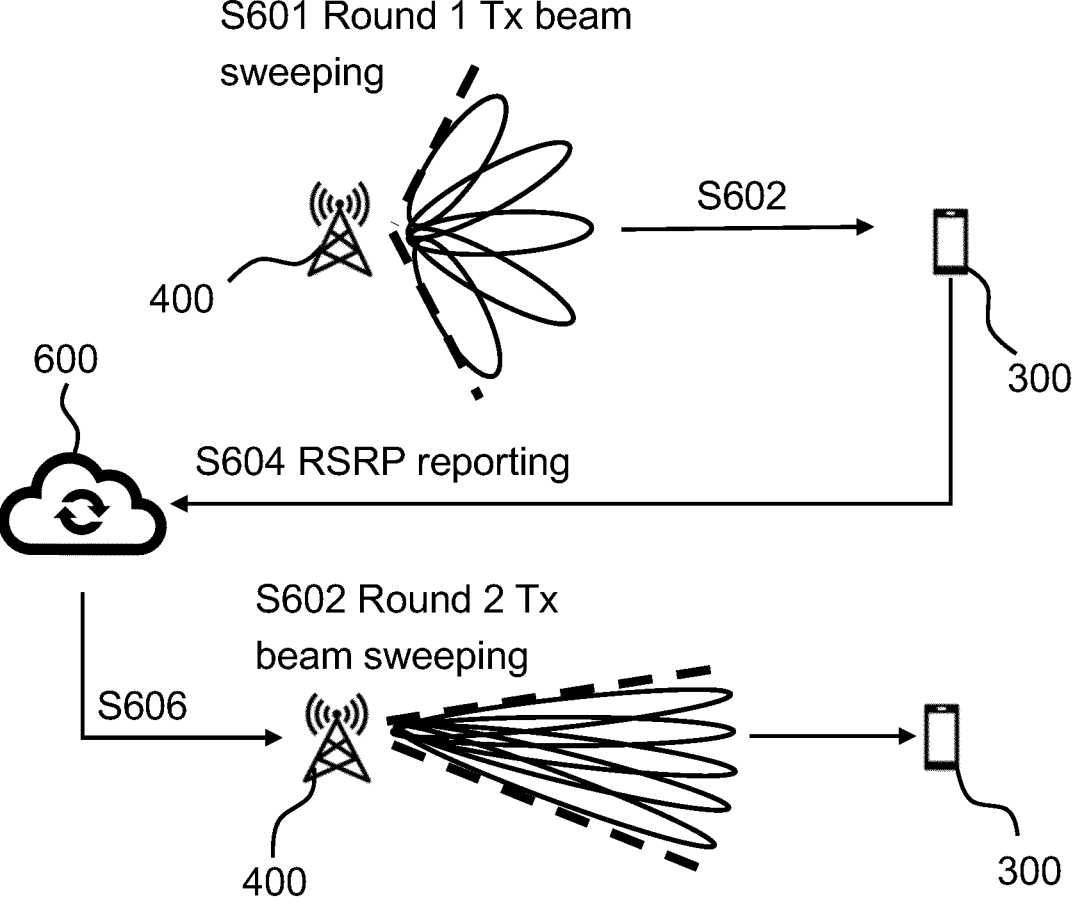
FIG. 6 is a signaling diagram illustrating an angle of departure positioning method in the downlink according to an example of this disclosure.

FIG. 6 discloses a positioning method performed in the DL according to one or more example methods of the current disclosure. The location network node 600 may estimate an AoD range, such as obtain an expected AoD range, based on historical measurements from the WD to the wireless node. The example positioning method can be described as follows: Firstly, the wireless node 600 may perform a first round of wide beam sweeping in a wide-angle range, such as over the entire range of angles available to the wireless node 400, to cover the whole cell area, in FIG. 6 referred to as round 1 Tx beam sweeping. This wide beam sweeping can be used to transmit S602 reference signals, such as legacy periodic PRS transmission. Then, the WD 300 may measure RSRP of the reference signals, such as PRS-RSRPs, of each beam of the beam sweep. The WD 300 may send S604 a measurement report comprising the RSRP for each beam or for each PRS resource ID to the location network node 600. Based on the measurement report from the WD 600 the location network node 600 may estimate, such as generate, an initial AoD estimation, (such as an AoD of the reference signal transmission). Thereafter, the location network node 600 may estimate the WD location. Based on the estimated WD location, the initial AoD estimation and/or the RSRP measurements from each wireless node 400, the location network node may calculate and assign an AoD uncertainty range to each wireless node 400, the range and the uncertainty range being associated with one specific WD 300 or group of WDs. In one or more example methods, the estimated AoD range may be given by the initial AoD estimation plus-minus the uncertainty range. This may particularly be useful in case each wireless node is triggered to transmit aperiodic PRS. The location network node may transmit S606, to the wireless node 400, assistance information comprising the estimated AoD range. After receiving the assistance information from the location network node 600, the wireless node 400 may perform a second round of beam sweeping based on the assistance information, such as a narrow beam sweeping in the estimated range of angles, such as in the estimated AoD range. This procedure can be performed repeatedly until the final measurement's uncertainty is within an acceptable, such as within a predetermined, range.

In one or more example methods, the location network node may estimate the range of angles, such as an expected AoD range for the WD, based on a number of wireless nodes. In practice, the number of wireless nodes associated with the WD positioning is typically more than three. Furthermore, the AoD uncertainty given by multiple wireless nodes can be smaller than the AoD uncertainty based only on information received from one or a few, such as two, wireless nodes. If the location network node can receive AoD measurements associated with multiple wireless nodes, it can provide a better estimate of the WD position and thus provide a smaller, such as narrower, range of angles to each wireless node than in the previous round of AoD measurements. Therefore, the wireless node can perform a narrower beam sweeping, such as beam sweeping using narrower beams, in the estimated range of AoDs, which may be smaller than the range of AoDs used for estimating the first, such as initial, position of the WD. This procedure can be repeatedly performed several times, such as until the uncertainty of the AoD does not change anymore. For each round of AoD measurements, the location network node may receive RSRP measurements associated with multiple wireless nodes from the WD and may estimate the WD location and the WD location's uncertainty accordingly. In one or more example methods, the location network node may calculate the expected AoD from each wireless node to the WD in the LCS and the corresponding AoD uncertainty. The estimated AoD range may be given by an expected AoD plus/minus the AoD uncertainty. The estimated AoD ranges may be wireless node/WD-specified since the AoDs from each wireless node toward a specific WD are different.

Figure 7:
FIG. 7 is a flow-chart illustrating an example method, performed in a wireless node, for enabling positioning of a wireless device according to this disclosure.

FIG. 7 shows a flow chart of an example method 100, performed by a wireless node, for enabling positioning of a wireless device (such as wireless device 300 of FIG. 1, FIG. 2, FIG. 3, FIG. 5, and FIG. 6) according to the disclosure. The wireless node is the wireless node disclosed herein, such as the wireless node 400 of FIG. 1, FIG. 2, FIG. 3, FIG. 5, FIG. 6, and FIG. 9. The network node may in one or more examples be a TRP and/or a gNB. The method 100 comprises receiving S104, from a location network node (such as location network node 600 of FIG. 1, FIG. 3, FIG. 4, FIG. 5 and FIG. 10), assistance information comprising an estimated range of angles to be used for a positioning method of the WD. Assistance information may be seen as information that may be used by the wireless node, to assist in the positioning method of the WD.

The method 100 comprises performing S106 a positioning method for the WD based on the assistance information. In one or more example methods, performing S106 the positioning method comprises performing the positioning method for the estimated range of angles, such as based on the estimated range of angles and/or associated information, such as validation information and/or reference information, when performing the positioning method. The positioning method performed by the wireless node may in one or more example methods be an UL-AoA positioning method and/or an DL-AoD positioning method. The positioning method performed based on the assistance information may result in a refined positioning measurement compared to the first estimated position of the WD.

In one or more example methods, the estimated range of angles is an estimated range of angles of, such as associated with, a first arrival path component, such as an estimated first arrival path component, of a reference signal transmission associated with the WD. The reference signal transmission associated with the WD may be a reference signal transmitted by the wireless node and received by the WD or a reference signal transmitted by the WD and received by the wireless node. The first arrival path component may for example be a LoS component of the reference signal transmission associated with the WD. The estimated range of angles may for example be a reduced range of angles which is a subset of a full range of angles available to the wireless node. The full range of angles may be a full range of angles covered by the transmit and/or receive beams of the wireless node. The estimated range of angles may in one or more example methods be associated with an estimated position of the WD. The estimated range of angles may for example cover and/or may be focused, such as narrowed, tailored, and/or directed, towards an area comprising the estimated position of the WD.

In one or more examples methods, the assistance information comprises reference information. The reference information may be seen as assistance information regarding where the wireless node should apply the range of angle information. The reference information may be indicative of a reference direction, such as a reference angle, of the estimated range of angles. The reference direction may in one or more examples be a center beam or a center angle in the GCS or the LCS of the range of angles. For example, if the range of angles is 60 degrees and the reference information indicates an angle of 45 degrees in the GCS, the wireless node may apply one or more beams with 60 degrees width in which the center beam is directed 45 degrees from a geographical north direction (in a clockwise and/or counter-clockwise direction). In one or more example methods, the reference information may be based on the LCS.

In one or more example methods, the assistance information comprises validation information. The validation information may be indicative of a time duration for which the assistance information, such as the estimated range of angles, is valid. The validation information may indicate to the wireless node how long the assistance information is valid, such as how long the wireless node can use, such as apply the assistance information. In one or more example methods, the validation information comprises a starting time for when the assistance information, such as the estimated range of angles, is valid. In other words, the starting time may indicate a time from which the time duration indicated by the validation information starts. The validation information can also be implicitly indicated. For example, the provided assistance information may only be valid for a given positioning request and/or measurement request.

In one or more example methods, the assistance information comprises a WD identifier indicative of the WD for which the assistance information is valid. Based on the WD identifier, the wireless node may identify the WD for which the assistance information, such as the estimated range of angles, is to be used. The WD identifier may in one or more example methods indicate the WD for which the positioning method is to be performed using the assistance information. For one or more example methods, such as for DL-PRS positioning methods, the WD identifier may be used to identify the WD to which the wireless node is to transmit reference signals, such as PRS.

In one or more example methods, the estimated range of angles is a range of Angles of Arrival, AoA, at the wireless node, of a reference signal to be received from the wireless device. This may be the case when the wireless node performs an AoA positioning method. In one or more example methods, such as when the estimated range of angles is a range of AoAs, performing S106 the positioning method comprises receiving S106A, from the WD, one or more reference signals. The received reference signals may for example be SRS received from the WD.

In one or more example methods, such as when the estimated range of angles is a range of AoAs, performing S106 the positioning method comprises performing S106B a positioning measurement based on the received one or more reference signals. In one or more example methods, the wireless node may filter out positioning measurements that are not performed on reference signals received within the estimated range of angles, such as in the estimated range of AoA.

In one or more example methods, the estimated range of angles is a range of Angles of Departure, AoD, from the wireless node of a reference signal to be transmitted to the wireless device. In one or more example methods, such as when the estimated range of angles is a range of AoDs, performing S106 the positioning method comprises transmitting S106C, to the WD, reference signals in the estimated range of AoDs. In one or more example methods, such as when the estimated range of angles is a range of AoDs, performing S106 the positioning method comprises receiving S106D, from the WD, a positioning measurement based on the reference signals transmitted in the estimated range of AoDs.

In one or more example methods, the assistance information comprises a beam configuration for the estimated range of angles for the wireless node 400. The beam configuration may be a beam configuration to be used by the wireless node when performing the positioning method according to the assistance information, such as according to the estimated range of angles. In one or more example methods, the beam configuration comprises a number of beams to be used and/or a beamwidth for each of the beams to be used. In one or more example methods, the beam configuration is a receive beam configuration for the estimated range of AoAs for the wireless node. The receive beam configuration may indicate one or more receive beams of the wireless node covering the estimated range of AoAs. The wireless node may in one or more example methods apply the receive beam configuration comprised in the assistance information and perform AoA measurements using only the receive beams according to the receive beam configuration. Thereby, the wireless node may use an improved beam configuration, which may result in better accuracy of the positioning of the WD.

In one or more example methods, the beam configuration is a transmit beam configuration for the estimated range of AoDs for the wireless node 400. The transmit beam configuration may thus provide specific information on the number of Tx beams and/or the beamwidth for each beam to be used for the AoD positioning method for the estimated range of angles. In one or more example methods, the beamwidth may be implicitly signalled. For example, if the estimated range of angles is 90 degrees and number of TX beams in the transmit beam configuration is equal to 10. Then, the beamwidth of each beam is 90/10=9 degrees per beam. In one or more example methods, the beam configuration may comprise a beam forming codebook, which determines the spatial properties of the beams. The wireless node may in one or more example methods apply the transmit beam configuration comprised in the assistance information and perform the AoD positioning method using only the receive beams according to the transmit beam configuration. The wireless node may for example transmit the reference signals, such as the PRS, with beams according to the transmit beam configuration. Thereby, an accuracy of the positioning of the WD may be increased.

In one or more example methods, the method 100 comprises providing S108, to the location network node 600, a measurement report comprising a positioning measurement for the WD obtained during the positioning method. The measurement report may for example comprise a positioning measurement, such as an AoA measurement performed based on the estimated range of angles.

In one or more example methods, the measurement report comprises a first positioning measurement for the estimated range of angles and a second positioning measurement for a wider range of angles, such as for the full range of angles available to the wireless node. In one or more example methods, the wireless node may consider that the calculation of the WD location without using the estimated range of angles may result in a more accurate estimation of the WD location. For example, if the WD performs a sudden movement then the assistance information, such as the estimated, such as expected, range of angles may no longer be valid. In this case the wireless node can provide a measurement report comprising both measurement results considering the assistance information, such as considering the estimated range of angles, and measurement results ignoring the assistance information, such as measurements performed over the entire angular spectrum. In one or more example methods, the measurement report may comprise an indication of whether the wireless node has applied the assistance information or ignored the assistance information when performing the positioning method. In one or more examples methods, the measurement report may comprise the range of angles that has been used for a particular measurement. In one or more example methods, such as for UL AoA procedures, the measurement report may comprise both AoA measurement results considering the assistance information, such as measurement results that are within the estimated range of angles, and the AoA measurement results ignoring the assistance information, such as AoA measurement results for the entire angular spectrum.

Figure 8:
FIG. 8 is a flow-chart illustrating an example method, performed in a location network node of a wireless communication system, for positioning a wireless device according to this disclosure.
Figure 8:
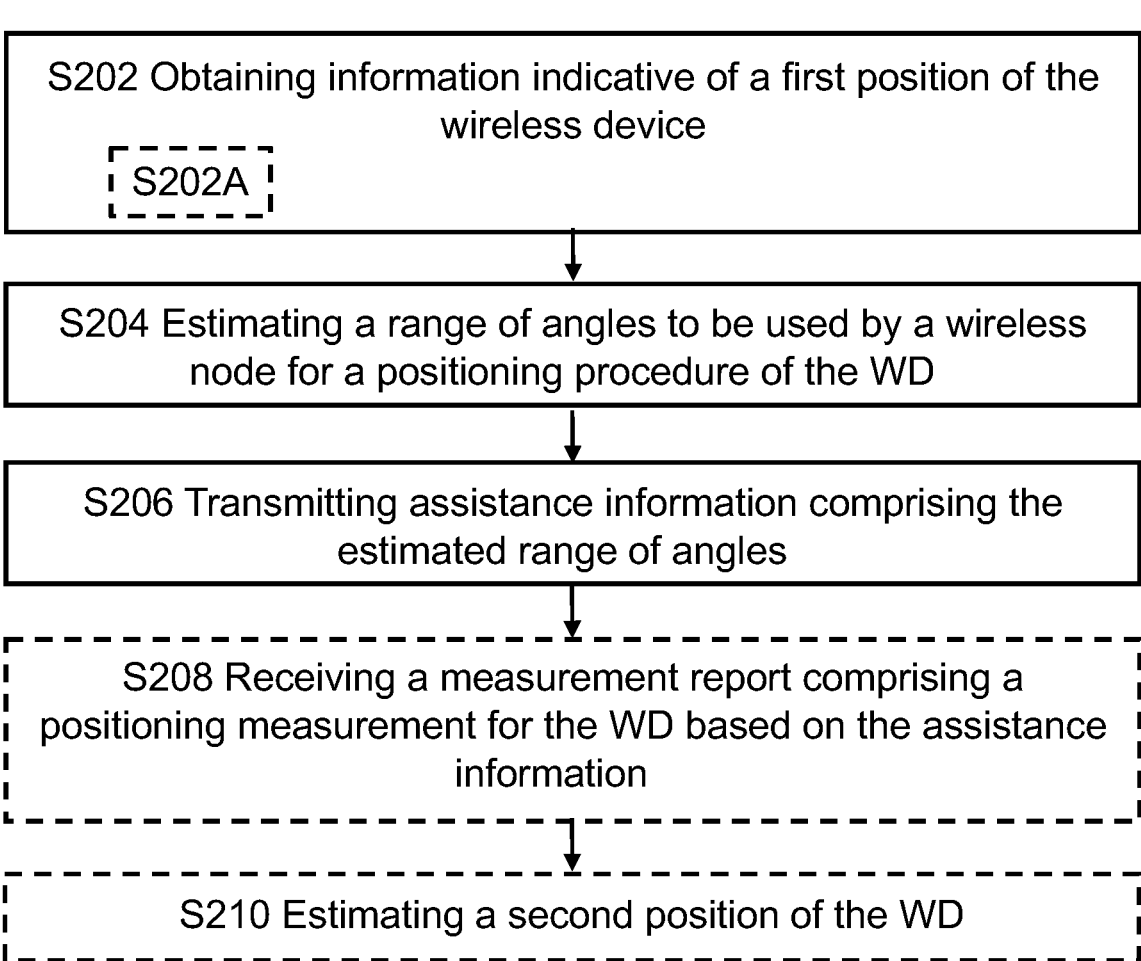

FIG. 8 shows a flow diagram of an example method 200, performed by a location network node (such as location network node 600 of FIG. 1, FIG. 3, FIG. 4, FIG. 5 and FIG. 10), for positioning a wireless device according to the disclosure. The method 200 comprises obtaining S202 information indicative of a first position of the wireless device.

The method 200 comprises transmitting S206, to the wireless node 400, assistance information comprising the estimated range of angles. The estimated range of angles comprised in the assistance information may indicate to the wireless node the range of angles to be used when performing a subsequent positioning method, such as a subsequent AoA and/or a subsequent AoD positioning method. The assistance information may further comprise information associated to and/or related to the estimated range of angles, such as reference information and/or validity information.

In one or more example methods, the first position of the WD may be an initial and/or rough estimation of the WD location. In one or more example methods, the information indicative of the first position may be historical WD location information, such as historical WD location estimations and location uncertainties. In one or more examples, the initial and/or rough estimation of the WD location can be based on AoA and/or AoD positioning methods or any other positioning method(s), such as positioning methods other than AoA or AoD positioning methods, such as GNSS, DL-TDoA, E-CID, etc. In one or more example methods, the information indicative of the first position of the WD may be obtained based on standard reference signal signaling, such as SRS and/or PRS signaling, and AoA and/or AoD measurement and reporting procedures. In one or more example methods, the obtaining S202 may be based on any other positioning method, such as Radio Access Technology (RAT) dependent methods (for example UL, DL, and/or enhanced Cell ID (e-CID) based positioning) or RAT independent methods (such as Global Navigation Satellite System (GNSS) based positioning).

In one or more example methods, obtaining S202 information indicative of the first position comprises receiving 5202A, from the WD, a measurement report comprising a quality metric for one or more beams transmitted from the wireless node. The quality metric may for example be RSRP, Reference Signal Received Quality (RSRQ), Channel Quality Indicator (CQI), Carrier Received Signal Strength Indicator (RSSI) and/or Signal to Interference plus Noise Ratio (SINR). The quality metric may for example be a qualitative value of one or more of the aforementioned quality metric. For example, a qualitative value=2 may mean that the quality metric is good, a qualitative value=2 may mean that the quality metric is medium, and a qualitative value=0 may mean that the quality metric is bad. In one or more example methods, the information indicative of the first position may be obtained by performing a rough AoD measurement based on reference signals, such as PRS, transmitted from the wireless node using wide beams and a wide beam sweeping range. The wide sweeping range may be a sweep over the entire angular spectrum available to the wireless node for beam sweeping. The WD may measure the reference signals received using the wide beams and the wide beam sweeping range. The location network node may receive a measurement report from the WD comprising measurements performed on the wide beams and wide beam sweep. The location network node may then estimate, for example by calculating, the first WD position of the WD based on the AoD measurements received from the WD for a plurality of wireless nodes. In one or more example methods, the first position is obtained by any other positioning method mentioned herein (such as DL-TDOA, GNSS; etc.).

The method 200 comprises estimating S204, based on the information indicative of the first position, a range of angles, such as a range of AoA and/or AoD, to be used by a wireless node (such as wireless node 400 of FIG. 1, FIG. 2, FIG. 3, FIG. 5, FIG. 6, and FIG. 9) for a positioning method of the WD.

In one or more example methods, the estimating S204 may comprise, for each measurement occasion, estimating, such as calculating, a first WD location and a location uncertainty of the WD based on the information indicative of the first position. The estimation of the first WD location may in one or more example methods be based on historical report information, such as previous AoA or AoD measurement reports and/or quality metrics associated with one or more, such as multiple, wireless nodes. The location network node may transform the calculated location and the location uncertainty of the WD into an estimated range of angles, such as an estimated AoA range and/or AoD range, for each wireless node. In one or more example methods, the estimating S204 may be based on one or multiple previous WD positions estimated within a predefined time duration. In one or more example methods, the estimating S204 may be based on the number of wireless nodes. By using multi-angulation, such as by receiving measurement results from a plurality of wireless nodes, the location network node can provide a more accurate range of angles. A more accurate range of angles may herein mean a narrower range of angles and/or having less uncertainty.

The estimated range of angles may be a reduced range of angles. The reduced range of angles may be a subset of a full range of angles available to the wireless node, such as the full range of angles available for performing a positioning method. In other words, the location network node may transmit an estimated subset of angles to the wireless node, which the wireless node may use when performing the subsequent positioning method. The estimated subset of angles may be an estimated subset of AoAs and/or AoDs at the wireless node.

In one or more example methods, the estimated range of angles is associated with the indicated first position of the WD. The estimated range of angles may for example be a range of angles covering the indicated first position of the WD or a range of angles in a direction of the indicated first position of the WD.

In one or more example methods, the estimated range of angles is an estimated range of angles of a first arrival path component of a reference signal transmission associated with the WD. The first arrival path component may for example be a LoS path component of the reference signal transmission associated with the WD. The reference signal transmission being associated with the WD herein means that the reference signal transmission is transmitted to or from the WD.

In one or more example methods, the estimated range of angles is an estimated range of Angles of Arrival, AoA, at the wireless node, of a reference signal received from the wireless device. The location network node may thus indicate to the wireless node an estimated range of angles to be used when performing the AoA positioning method. In one or more example methods the assistance information comprises a receive beam configuration for the estimated range of AoA for the wireless node. The receive beam configuration, may in one or more example methods, comprise a number of receive beams to be used and/or a beamwidth for each of the receive beams. The location network node may thus configure the receive beam configuration to be used by the wireless node when performing the AoA positioning method.

In one or more example methods, the estimated range of angles is an estimated range of Angles of Departure, AoD, from the wireless node of a reference signal transmitted to the wireless device. The location network node may thus indicate, to the wireless node, an estimated range of angles to be used when performing the AoD positioning method. In one or more example methods, the assistance information comprises a transmit beam configuration for the estimated range of AoD to be used by the wireless node in the positioning method. In one or more example methods, the transmit beam configuration comprises a number of transmit beams and/or a beamwidth for each of the transmit beams to be used for the positioning method.

In one or more example methods, the assistance information comprises validation information, such as explicit validation information, indicative of a time duration for which the assistance information, such as the estimated range of angles, is valid. The validation information may be explicit and/or implicit. In one or more example methods, the request from the location network node to the wireless node, may not contain explicit validity information. However, the wireless node may be configured to interpret the assistance information only being valid for that particular positioning and/or measurement request. The wireless node may apply the assistance information for a measurement performed in response to the positioning request and/or measurement request comprising the assistance information and may refrain from applying the assistance information for a measurement in response to a subsequent positioning request and/or measurement request if that subsequent positioning request and/or measurement request does not contain the assistance information.

In one or more example methods, the assistance information comprises a WD identifier indicative of the WD for which the assistance information is valid. The estimated range of angles may be specific for each WD and wireless node combination. The estimated range of angles being specific for each WD and wireless node combination means that one range of angles is associated with one specified wireless node and one specified WD or group of WDs. The WD identifier may thus be used to identify the WD that is associated to the assistance information. The WD identifier may in one or more example methods identify a WD that may use an on-demand and/or aperiodic PRS transmission. In one or more example methods, the estimated range of angles and/or the validation information may be estimated using Artificial Intelligence (AI) computation and/or Machine Learning (ML) operations.

In one or more example methods, the range of angles comprises azimuth angles and/or zenith angles. The range of AoAs may thus comprise a range of azimuth AoAs and/or a range of azimuth AoDs. The zenith angles may in one or more example methods be zenith AoAs and/or zenith AoDs. In one or more example methods, the range of angles may be given by an upper and a lower bound of an interval, such as an upper and a lower bound of a range of azimuth angles and/or a range of zenith angles. An example of a reporting format of range of angles can be found in the table below.

| IE/Group Name | Presence | Range | IE Type and Reference | Semantics Description |
|---|---|---|---|---|
| Expected Angle Of Departure/Angle Of Arrival Range List | | | | |
| >Expected Angle Of Departure/Angle Of Arrival Range Item | | 1 . . . <maxnoTRPs> | | |
| >>TRP ID | | | | |
| >>Azimuth Angle of Departure/Angle Of Arrival upper bound | M | | INTEGER(0 . . . 3599) | |
| >>Azimuth Angle of Departure/Angle Of Arrival lower bound | M | | INTEGER(0 . . . 3599) | |
| >>Zenith Angle of Departure/Angle Of Arrival upper bound | M | | INTEGER(0 . . . 1799) | |
| >>Zenith Angle of Departure/Angle Of Arrival lower bound | M | | INTEGER(0 . . . 1799) | | validation information comprises a starting time for when the assistance information, such as the estimated range of angles, is valid.

The validation information may in one or more example methods be implicitly informed or understood by the wireless node. The assistance information, which may be transmitted together with positioning and/or measurement In one or more example methods, the method 200 comprises receiving S208, from the wireless node 400, a measurement report comprising a positioning measurement for the WD based on the assistance information. The measurement report may comprise AoA measurements performed in the estimated range of AoA angles. In one or more example methods, the measurement report may further comprise a positioning measurement performed based on the entire angular spectrum available. In one or more example methods, the wireless node may determine that an estimation of the WD position without using the estimated range of angles may improve the estimation of the WD position. For example, if the WD performs a sudden movement then the assistance information, such as the estimated range of angles, may no longer be valid. In this case the wireless node may provide both measurement results considering the assistance information and measurement results ignoring the assistance information. When the wireless node ignores the assistance information it may use a wider angular spectrum, such as the entire angular spectrum of its transmit beams and/or receive beams, when performing the measurements.

In one or more example methods, the method 200 comprises estimating S210, based on the received measurement report, a second position of the WD. By estimating the second position using the measurement reports received based on the positioning methods performed based on the assistance information, a more up-to-date and potentially more accurate position of the WD may be estimated.

Figure 9:
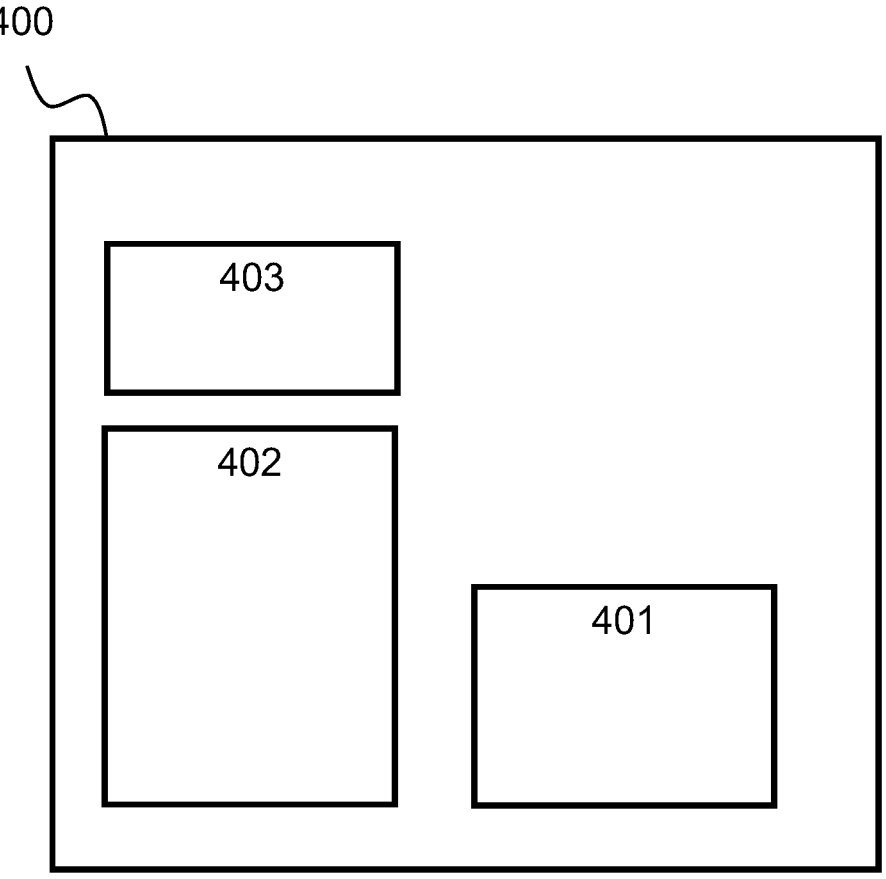
FIG. 9 is a block diagram illustrating an example wireless node according to this disclosure.

FIG. 9 shows a block diagram of an example wireless node 400 according to the disclosure. The wireless node 400 comprises memory circuitry 401, processor circuitry 402, and an interface 403. The wireless node 400 may be configured to perform any of the methods disclosed in FIG. 7. In other words, the wireless node 400 may be configured for enabling positioning of a WD (such as WD 300 of FIG. 1, FIG. 2, FIG. 3, FIG. 5, and/or FIG. 6).

The wireless node 400 may be a radio network node, such as a transmission point or a gNB. The wireless node 400 is configured to communicate with a WD, such as the WD disclosed herein, and location network node, such as the location network node disclosed herein, using a communication system (such as a wired and/or wireless communication system).

The interface 403 is configured for wireless communications via a wireless communication system, such as a 3GPP system, such as a 3GPP system supporting New Radio, NR.

The interface 403 is configured to communicate with the network node disclosed herein (such as location server) via a wired and/or wireless communication system.

The wireless node 400 is configured to receive (such as via the interface 403) from a location network node (such as location network node 600 of FIG. 1, FIG. 3, FIG. 4, FIG. 5 and/or FIG. 10), assistance information comprising an estimated range of angles to be used for a positioning method of the WD.

The wireless node 400 is configured to perform (such as using the processor circuitry 402) a positioning method for the WD based on the assistance information.

Processor circuitry 402 is optionally configured to perform any of the operations disclosed in FIG. 7 (such as any one or more of S106A, S106B, S106C, S106D, S108). The operations of the wireless node 400 may be embodied in the form of executable logic routines (for example, lines of code, software programs, etc.) that are stored on a non-transitory computer readable medium (for example, memory circuitry 401) and are executed by processor circuitry 402.

Furthermore, the operations of the network node 400 may be considered a method that the wireless node 400 is configured to carry out. Also, while the described functions and operations may be implemented in software, such functionality may also be carried out via dedicated hardware or firmware, or some combination of hardware, firmware and/or software.

Memory circuitry 401 may be one or more of a buffer, a flash memory, a hard drive, a removable media, a volatile memory, a non-volatile memory, a random access memory (RAM), or other suitable device. In a typical arrangement, memory circuitry 401 may include a non-volatile memory for long term data storage and a volatile memory that functions as system memory for processor circuitry 402. Memory circuitry 401 may exchange data with processor circuitry 402 over a data bus. Control lines and an address bus between memory circuitry 401 and processor circuitry 402 also may be present (not shown in FIG. 9). Memory circuitry 401 is considered a non-transitory computer readable medium.

Memory circuitry 401 may be configured to store information (such as information indicative of positioning method, range of angles, beam configuration, and assistance information) in a part of the memory.

Figure 10:
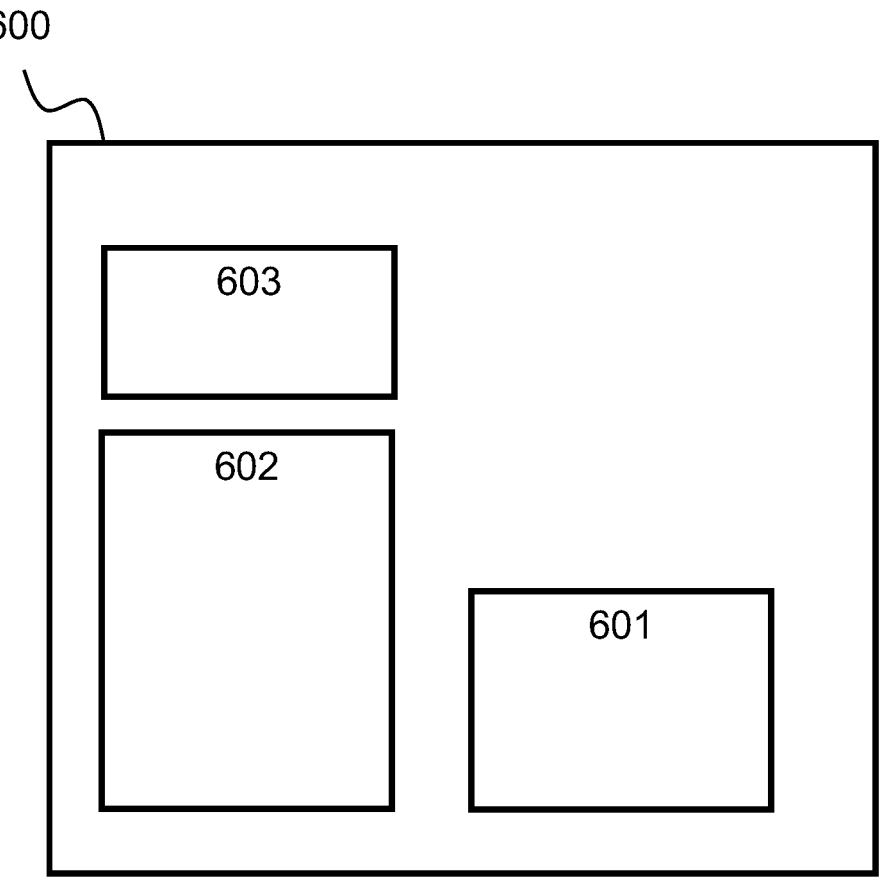
FIG. 10 is a block diagram illustrating an example location network node according to this disclosure.

FIG. 10 shows a block diagram of an example location network node 600 according to the disclosure. The location network node 600 comprises memory circuitry 601, processor circuitry 602, and an interface 603. The location network node 600 may be configured to perform any of the methods disclosed in FIG. 8.

The location network node 600 may be a location server and/or a location management function.

The location network node 600 is configured to communicate with a wireless node, such as the wireless node disclosed herein, using a communication system (a wired and/or wireless communication system). The interface 603 is configured for communications via the communication system, such as a communication system supporting positioning of the wireless device. The communication system may comprise a wireless communication network to communicate with the wireless device.

The location network node 600 is configured for positioning a wireless device (such as wireless device 300 of FIG. 1, FIG. 2, FIG. 3, FIG. 5, and/or FIG. 6).

The location network node 600 is configured to obtain (such as via the interface 603) information indicative of a first position of the wireless device.

The location network node 600 is configured to estimate (such as using the processor circuitry 602), based on the information indicative of the first position, a range of angles to be used by a wireless node (such as wireless node 400 of FIG. 1, FIG. 2, FIG. 3, FIG. 5, FIG. 6, and/or FIG. 9) for a positioning method of the WD.

The location network node 600 is configured to transmit, to the wireless node 400, assistance information comprising the estimated range of angles.

Processor circuitry 602 is optionally configured to perform any of the operations disclosed in FIG. 8 (such as any one or more of S202A, S208, S210). The operations of the location network node 600 may be embodied in the form of executable logic routines (for example, lines of code, software programs, etc.) that are stored on a non-transitory computer readable medium (for example, memory circuitry 601) and are executed by processor circuitry 602.

Furthermore, the operations of location network node 600 may be considered a method that location network node 600 is configured to carry out. Also, while the described functions and operations may be implemented in software, such functionality may also be carried out via dedicated hardware or firmware, or some combination of hardware, firmware and/or software.

Memory circuitry 601 may be one or more of a buffer, a flash memory, a hard drive, a removable media, a volatile memory, a non-volatile memory, a random access memory (RAM), or other suitable device. In a typical arrangement, memory circuitry 601 may include a non-volatile memory for long term data storage and a volatile memory that functions as system memory for processor circuitry 602. Memory circuitry 601 may exchange data with processor circuitry 602 over a data bus. Control lines and an address bus between memory circuitry 601 and processor circuitry 602 also may be present (not shown in FIG. 10). Memory circuitry 601 is considered a non-transitory computer readable medium.

Memory circuitry 601 may be configured to store information (such as information indicative of measurement report, assistance information, range of angles) in a part of the memory.

Examples of methods and products (wireless node and location network node) according to the disclosure are set out in the following items:

Item 1. A method, performed by a wireless node, for enabling positioning of a wireless device, WD, the method comprising:

receiving (S104), from a network node, assistance information comprising an estimated range of angles to be used for a positioning method of the WD, and performing (S106) a positioning method for the WD based on the assistance information.

Item 2. The method according to Item 1, wherein performing (S106) the positioning method comprises performing the positioning method for the estimated range of angles.

Item 3. The method according to Item 1 or 2, wherein the estimated range of angles is a reduced range of angles which is a subset of a full range of angles available to the wireless node.

Item 4. The method according to any one of the previous Items, wherein the estimated range of angles is associated with an estimated position of the WD.

Item 5. The method according to any one of the previous Items, wherein the estimated range of angles is an estimated range of angles of a first arrival path component of a reference signal transmission associated with the WD.

Item 6. The method according to any one of the previous Items, wherein the method comprises:

providing (S108), to the location network node, a measurement report comprising a positioning measurement for the WD obtained during the positioning method.

Item 7. The method according to Item 6 and Item 3, wherein the measurement report comprises a first positioning measurement for the estimated range of angles and a second positioning measurement for a wider range of angles available to the wireless node.

Item 8. The method according to Item 6 or 7, wherein the measurement report comprises an indication of whether the wireless node has applied the assistance information when performing the positioning method.

Item 9. The method according to any one of the previous Items, wherein the assistance information comprises validation information indicative of a time duration for which the assistance information is valid.

Item 10. The method according to Item 9, wherein the validation information comprises a starting time for when assistance information is valid.

Item 11. The method according to any one of the previous Items, wherein the assistance information comprises reference information indicative of the reference direction of the estimated range of angles.

Item 12. The method according to any one of the previous Items, wherein the assistance information comprises a WD identifier indicative of the WD for which the assistance information is valid.

Item 13. The method according to any one of the previous Items, wherein the estimated range of angles is a range of Angles of Arrival, AoA, at the wireless node, of a reference signal to be received from the wireless device.

Item 14. The method according to Item 13, wherein performing (S106) the positioning method comprises:

receiving (S106A), from the WD, one or more reference signals, performing (S106B) a positioning measurement based on the received one or more reference signals.

Item 15. The method according to any one of the Items 13 to 14, wherein the assistance information comprises a receive beam configuration for the estimated range of AoA for the wireless node.

Item 16. The method according to Item 15, wherein the receive beam configuration comprises a number of receive beams to be used and/or a beamwidth for each of the receive beams.

Item 17. The method according to any one of the Items 1 to 12, wherein the estimated range of angles is a range of Angles of Departure, AoD, from the wireless node of a reference signal to be transmitted to the wireless device.

Item 18. The method according to Item 17, wherein performing (S106) the positioning method comprises:

transmitting (S106C), to the WD, reference signals in the estimated range of AoD, and receiving (S106D), from the WD, a positioning measurement based on the reference signals transmitted in the estimated range of AoD.

Item 19. The method according to any one of the Items 17 to 18, wherein the assistance information comprises a transmit beam configuration for the estimated range of AoD for the wireless node.

Item 20. The method according to Item 19, wherein the transmit beam configuration comprises a number of transmit beams to be used and/or a beamwidth for each of the transmit beams.

Item 21. A method, performed by a location network node, for positioning a wireless device, the method comprising:

obtaining (S202) information indicative of a first position of the wireless device, estimating (S204), based on the information indicative of the first position, a range of angles to be used by a wireless node for a positioning method of the WD, and transmitting (S206), to the wireless node, assistance information comprising the estimated range of angles.

Item 22. The method according to Item 21, wherein the method comprises:

receiving (S208), from the wireless node, a measurement report comprising a positioning measurement for the WD based on the assistance information.

Item 23. The method according to Item 22, wherein the method comprises:

estimating (S210), based on the received measurement report, a second position of the WD.

Item 24. The method according to any one of the Items 21 to 23, wherein the estimated range of angles is a reduced range of angles which is a subset of a full range of angles available to the wireless node.

Item 25. The method according to any one of the Items 21 to 24, wherein the estimated range of angles is associated with the indicated first position of the WD.

Item 26. The method according to any one of the previous Items 21 to 25, wherein the estimated range of angles is an estimated range of angles of a first arrival path component of a reference signal transmission associated with the WD.

Item 27. The method according to any one of the previous Items 21 to 26, wherein the assistance information comprises validation information indicative of a time duration for which the assistance information is valid.

Item 28. The method according to Item 27, wherein the validation information comprises a starting time for when the assistance information is valid.

Item 29. The method according to any one of the previous Items 21 to 28, wherein the assistance information comprises a WD identifier indicative of the WD for which the assistance information is valid.

Item 30. The method according to any one of the previous Items 21 to 29, wherein the estimated range of angles is an estimated range of Angles of Arrival, AoA, at the wireless node, of a reference signal received from the wireless device.

Item 31. The method according to Items 30, wherein the assistance information comprises a receive beam configuration for the estimated range of AoA for the wireless node.

Item 32. The method according to Item 31, wherein the receive beam configuration comprises a number of receive beams to be used and/or a beamwidth for each of the receive beams.

Item 33. The method according to any one of the Items 21 to 29, wherein the estimated range of angles is an estimated range of Angles of Departure, AoD, from the wireless node of a reference signal transmitted to the wireless device.

Item 34. The method according to Item 33, wherein the assistance information comprises a transmit beam configuration for the estimated range of AoD to be used by the wireless node in the positioning method.

Item 35. The method according to Item 34, wherein the transmit beam configuration comprises a number of transmit beams and/or a beamwidth for each of the transmit beams to be used for the positioning method.

Item 36. The method according to Items 33 to 35, wherein obtaining (S202) information indicative of the first position comprises receiving (S202A), from the WD, a measurement report comprising a quality metric for one or more beams transmitted from the wireless node.

Item 37. The method according to any one of Items 30 to 36, wherein the range of angles comprises azimuth angles and/or zenith angles.

Item 38. A wireless node comprising memory circuitry, processor circuitry, and a wireless interface, wherein the wireless device is configured to perform any of the methods according to any of Items 1-20.

Item 39. A location network node comprising memory circuitry, processor circuitry, and a wireless interface, wherein the location network node is configured to perform any of the methods according to any of Items 21-37.

The use of the terms "first", "second", "third" and "fourth", "primary", "secondary", "tertiary" etc. does not imply any particular order, but are included to identify individual elements, such as individual estimated positions. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1-10 comprise some circuitries or operations which are illustrated with a solid line and some circuitries or operations which are illustrated with a dashed line. Circuitries or operations which are comprised in a solid line are circuitries or operations which are comprised in the broadest example. Circuitries or operations which are comprised in a dashed line are examples which may be comprised in, or a part of, or are further circuitries or operations which may be taken in addition to circuitries or operations of the solid line examples. It should be appreciated that these operations need not be performed in order presented. Furthermore, it should be appreciated that not all of the operations need to be performed. The example operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the examples may be implemented at least in part by means of both hardware and software, and that several "means", "units" or "devices" may be represented by the same item of hardware.

The various example methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly, to be regarded in an illustrative rather than restrictive sense. The claimed disclosure is intended to cover all alternatives, modifications, and equivalents.

The invention claimed is:

1. A method, performed by a wireless node, for enabling positioning of a wireless device (WD) the method comprising:

receiving, from a location network node, assistance information comprising an estimated range of angles to be used for a positioning method of the WD, wherein the estimated range of angles is an estimated range of Angles of Arrival, AoA, at the wireless node of a reference signal received from the wireless device and/or an estimated range of Angles of Departure, AoD, from the wireless node of a reference signal transmitted to the wireless device, and performing, for the estimated range of angles, a positioning method for the WD based on the assistance information, the positioning method comprises receiving, from the WD, one or more reference signals, and performing a positioning measurement based on the received one or more reference signals.

2. The method according to claim 1, wherein performing the positioning method comprises performing the positioning method for the estimated range of angles.

3. The method according to claim 1, wherein the estimated range of angles is a reduced range of angles which is a subset of a full range of angles available to the wireless node.

4. The method according to claim 3, wherein the method comprises: providing, to the location network node, a measurement report comprising a positioning measurement for the WD obtained during the positioning method, and wherein the measurement report comprises a first positioning measurement for the estimated range of angles and a second positioning measurement for a wider range of angles available to the wireless node.

5. The method according to claim 1, wherein the estimated range of angles is associated with an estimated position of the WD.

6. The method according to claim 1, wherein the estimated range of angles is an estimated range of angles of a first arrival path component of a reference signal transmission associated with the WD.

7. The method according to claim 1, wherein the method comprises: providing, to the location network node, a measurement report comprising a positioning measurement for the WD obtained during the positioning method.

8. The method according to claim 7, wherein the measurement report comprises an indication of whether the wireless node has applied the assistance information when performing the positioning method.

9. The method according to claim 1, wherein the assistance information comprises validation information indicative of a time duration for which the assistance information is valid.

10. The method according to claim 9, wherein the validation information comprises a starting time for when assistance information is valid.

11. The method according to claim 1, wherein the assistance information comprises reference information indicative of the reference direction of the estimated range of angles.

12. The method according to claim 1, wherein the assistance information comprises a WD identifier indicative of the WD for which the assistance information is valid.

13. The method according to claim 1, wherein the assistance information comprises a receive beam configuration for the estimated range of AoA for the wireless node.

14. The method according to claim 13, wherein the receive beam configuration comprises a number of receive beams to be used and/or a beamwidth for each of the receive beams.

15. The method according to claim 1, wherein performing the positioning method comprises:

transmitting, to the WD, reference signals in the estimated range of AoD, and receiving, from the WD, a positioning measurement based on the reference signals transmitted in the estimated range of AoD.

16. The method according to claim 1, wherein the assistance information comprises a transmit beam configuration for the estimated range of AoD for the wireless node.

17. A method, performed by a location network node, for positioning a wireless device (WD), the method comprising:

obtaining information indicative of a first position of the wireless device, estimating, based on the information indicative of the first position, a range of angles to be used by a wireless node for a positioning method of the WD, wherein the range of angles is an estimated range of Angles of Arrival, AoA, at the wireless node, of a reference signal received from the wireless device and/or an estimated range of Angles of Departure, AoD, from the wireless node of a reference signal transmitted to the wireless device, and transmitting, to the wireless node, assistance information comprising the estimated range of angles, wherein the wireless node performs, for the estimated range of angles, a positioning method for the WD based on the assistance information, the positioning method comprises receiving at the wireless node, from the WD, one or more reference signals, and performing a positioning measurement based on the received one or more reference signals.

* * * * *